(12) United States Patent
Murray et al.

(10) Patent No.: US 8,825,429 B2
(45) Date of Patent: Sep. 2, 2014

(54) METHOD AND APPARATUS FOR VERIFYING SCALE CALIBRATION

(75) Inventors: Gary Murray, Montpelier, OH (US); Anthony Thompson, Faribault, MN (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 1045 days.

(21) Appl. No.: 12/262,387

(22) Filed: Oct. 31, 2008

(65) Prior Publication Data
US 2009/0119051 A1 May 7, 2009

Related U.S. Application Data

(60) Provisional application No. 60/985,020, filed on Nov. 2, 2007.

(51) Int. Cl.
*G01F 1/12* (2006.01)
*G01G 23/01* (2006.01)
*G01G 17/06* (2006.01)
*G01G 21/22* (2006.01)

(52) U.S. Cl.
CPC ............ *G01G 23/012* (2013.01); *G01G 23/01* (2013.01); *G01G 17/06* (2013.01); *G01G 21/22* (2013.01)
USPC .................................................. 702/100

(58) Field of Classification Search
CPC .................................................. G01G 23/012
USPC ............. 702/100; 62/149; 177/132; 73/1.13; 335/295
See application file for complete search history.

(56) References Cited

U.S. PATENT DOCUMENTS

| | | | | |
|---|---|---|---|---|
| 3,250,962 | A * | 5/1966 | Palme | 335/295 |
| 6,141,977 | A * | 11/2000 | Zugibe | 62/149 |
| 2003/0015354 | A1 * | 1/2003 | Edwards et al. | 177/132 |

* cited by examiner

*Primary Examiner* — Tung S Lau
*Assistant Examiner* — Xiuquin Sun
(74) *Attorney, Agent, or Firm* — Baker & Hostetler LLP

(57) ABSTRACT

An apparatus and method are provided in order to verify the calibration on the fluid handling system. A magnet coupled to the scale is used to attach a precalibrated weight so that a controller in the system can determine if the scale needs to be calibrated. This way a storage tank does not need to be removed in order to check the calibration of the scale. The system can be locked down if the calibration is not within the predetermined calibration tolerance.

18 Claims, 4 Drawing Sheets

METHOD AND APPARATUS FOR VERIFYING SCALE CALIBRATION

CROSS-REFERENCE TO RELATED APPLICATIONS

This application claims priority to U.S. Provisional Application No. 60/985,020, entitled "METHOD AND APPARATUS FOR VERIFYING SCALE CALIBRATION," filed Nov. 2, 2007, the disclosure of which is hereby incorporated in its entirety.

FIELD OF THE INVENTION

The present invention relates generally to verifying that a scale is properly calibrated. More particularly, the present invention relates to a method and apparatus for determining whether a scale in a fluid servicing device, such as a fluid handling system needs to be calibrated.

BACKGROUND OF THE INVENTION

Refrigerant handling systems such as a refrigerant recovery, recycling and recharging unit have internal scales that are used, among other things, to weigh a storage tank containing refrigerant. One way to test the scale to ensure it is calibrated is to use a weight having a known weight. To determine if a scale is calibrated, a user puts the calibrated weight on the scale and compares the reading of the scale with the known weight. The weight is typically attached to auxiliary hardware such as hooks or baskets and thus may introduce potential errors. Additionally, the refrigerant tank typically sits on the scale and is secured to a housing of the unit. In order to test the calibration of the scale, the unit must be dismantled and the tank must be removed thereby taking up valuable time that could be used to otherwise service a vehicle.

In addition to providing good operation of a fluid handling system, calibration of an internal scale may also be required by industry standards. For example, SAE J-2788 requires that certain refrigerant handling systems include a means for the user to verify that an internal scale is calibrated.

Accordingly, it is desirable to provide a method and apparatus that in some embodiments of the invention, permit a user to determine whether an internal scale for a refrigerant handling system is calibrated.

SUMMARY OF THE INVENTION

The foregoing needs are met, to a great extent, by the present invention, wherein in one aspect an apparatus is provided that in some embodiments of the invention permits a user to verify whether an internal scale of a refrigerant handling system is calibrated.

The foregoing needs are met, to a great extent, by certain embodiments of the present invention. In accordance with one embodiment of the invention, a method of calibrating a vehicle refrigerant servicing machine is provided, which can include selecting a calibration mode from a menu on a control panel of the machine, taking a reference reading of a refrigerant container with a controller and scale that are part of the machine, attaching a precalibrated weight to a magnet coupled to the machine, performing a calibration check with the controller and a calibration software, wherein the calibration software communicates with the controller, and displaying the calibration check results on a display.

In accordance with another embodiment of the invention, a refrigerant recovery machine for use with a vehicle's cooling system is provided, which can include a refrigerant container containing a refrigerant for use with the vehicle's cooling system, a scale having a first side and a second side, the scale's first side being coupled to the refrigerant container to measure the amount of refrigerant in the container, a magnet coupled to the scale's second side and configured to couple to a precalibrated weight, a pump configured to move the refrigerant to and from the vehicle's cooling system, a display that displays information, and a controller that controls the scale, the pump and the display.

In accordance with yet another embodiment of the invention, a refrigerant recovery machine for use with a vehicle's cooling system is provided, which can include a means for containing configured to contain a refrigerant for use with the vehicle's cooling system, a means for measuring having a first side coupled with means for containing and to measure the amount of refrigerant in the means for containing, a means for attaching configured to couple with the means for measuring's second side and to couple to a precalibrated weight, a means for pumping configured to move the refrigerant to and from the vehicle's cooling system, means for displaying configured to display information, and a means for controlling configured to control the means for measuring, the means for pumping and the means for displaying.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
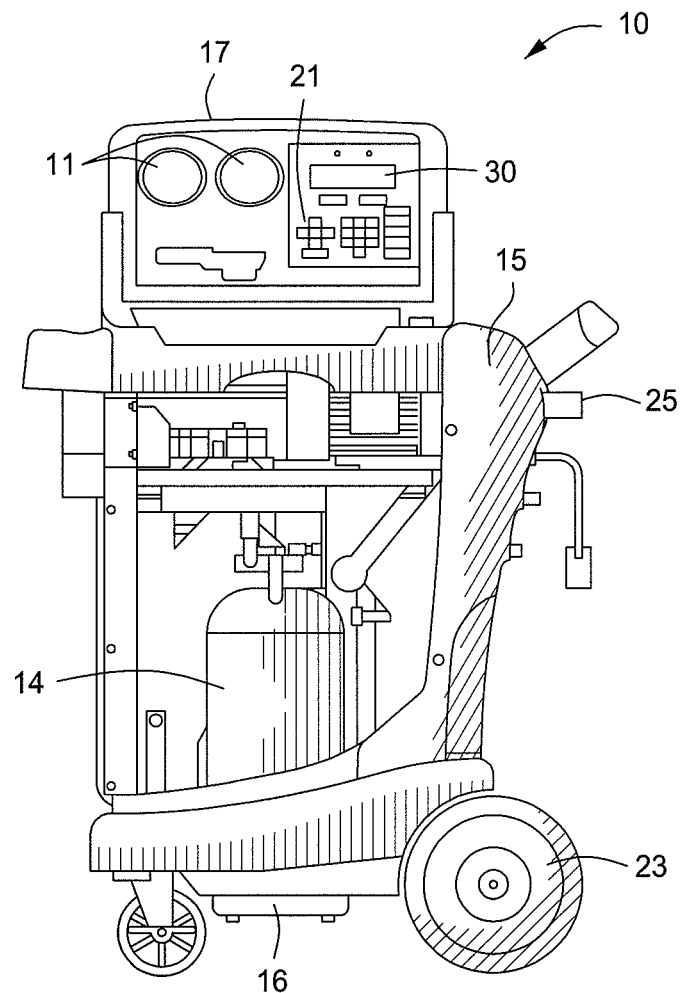
FIG. 1 illustrates a fluid handling system according to an embodiment of the invention.

The invention will now be described with reference to the drawing figures, in which like reference numerals refer to like parts throughout. An embodiment in accordance with the present invention provides a scale with a magnet that can be used to attach a known weight in order to verify the calibration of the scale. In some embodiments of the invention, the scale can be adapted to be used in existing fluid handling system.

Turning now to FIG. 1, which illustrates a fluid handling system 10 according to an embodiment of the invention. An example of a fluid handling system is a refrigerant recovery, recycling, and recharging unit (Cooltech™ model 34788) sold under the ROBINAIR™ name by SPX Corporation, located at 655 Eisenhower Drive, Owatonna, Minn. The fluid handling system 10 includes a housing 15, a control panel 17, a storage tank 14, a scale 16, a fill port 25 and casters 23. Additional components are discussed in FIG. 2 below.

The housing 15 houses the various components of the refrigerant handling system 10 and along with the casters allow the system 10 to be mobile around a service garage. The housing 15 provides a fill port 25 that can be used to refill the storage tank 14 with refrigerant or other desired fluids. The storage tank 14 is seated on the scale 16 (discussed further below). The storage tank 14 is secured to a portion of the housing so that it does not move when the system 10 is moved throughout the service garage.

The control panel 17 allows a user to control the various functions of the system 10, such as recovery, recycling, recharging and calibrating. The control panel can fold for storage purposes. The control panel 17 includes a display 30 to display or indicate various messages to the user (discussed further below). The control panel further includes various, expansion slots (not shown), buttons and keypads 21 and gauges 11. The buttons and the keypads 21 allow a user to enter information such as selecting a vehicle type or selecting the function (recharging, ect.) that the system should be performing. The gauges 11 show the low-side and high-side pressures. The expansion slots allows the addition of information or functionality to system 10 including updating the software of the system 10.

Figure 2:
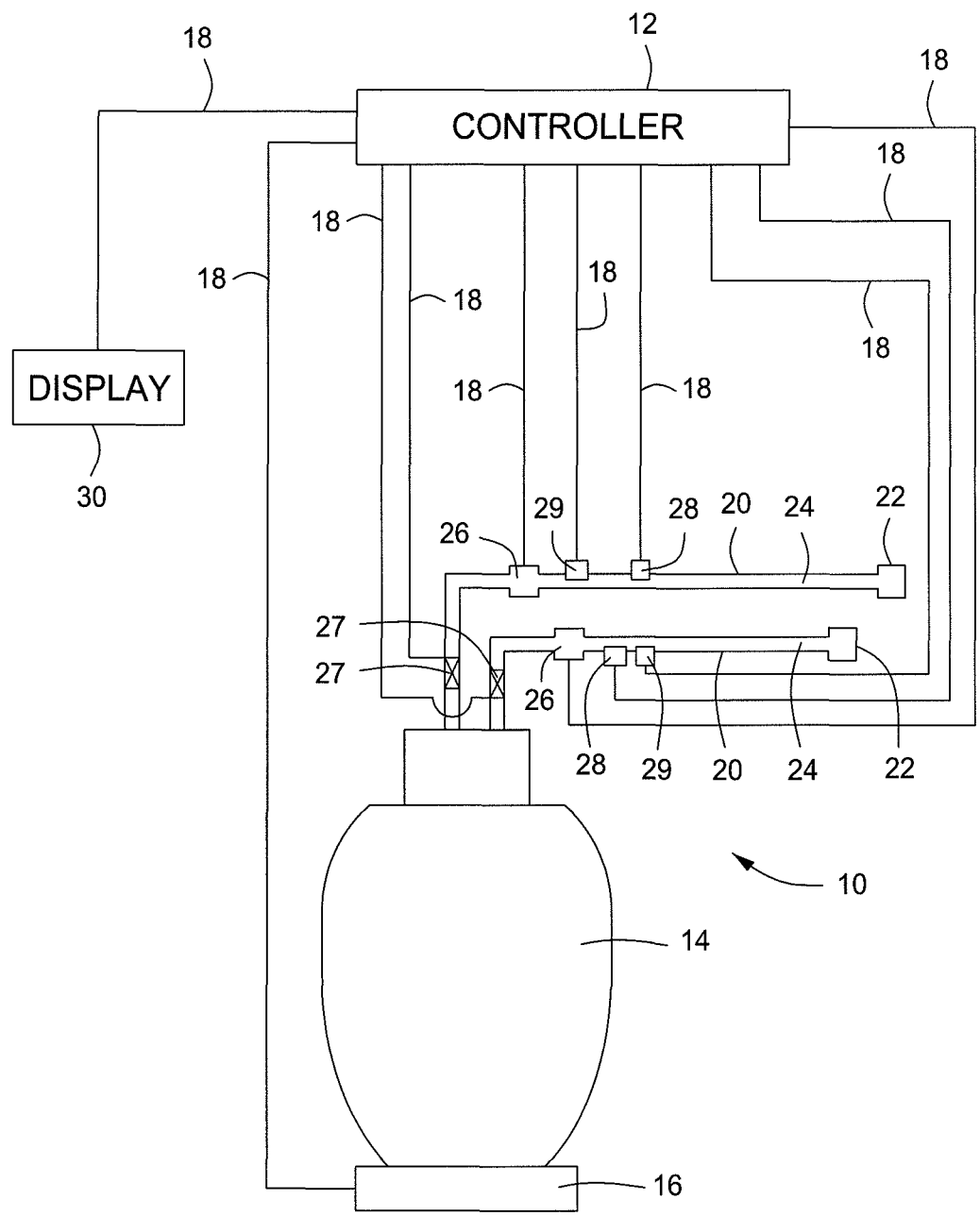
FIG. 2 is a schematic diagram of certain components of a fluid handling system according to one embodiment of the invention.

Turning now to FIG. 2, is a schematic diagram of certain components of the fluid handling system 10 according to one embodiment of the invention. The system 10 includes a controller 12 and the storage tank 14 used to store fluid such as a refrigerant. The controller 12 controls various functions of the refrigerant handling system and may be located in the control panel 17. The controller 12, in some embodiments of the invention, is a microcontroller that can be programmed and/or reprogrammed with processor readable code that will cause the controller to send signals to various parts of the fluid handling system to perform various tasks. Additionally, the controller 12 can also receive data from components of the system 10, such as sensors or from manual inputs from the user. One such task is to calibrate a scale as discussed below.

The storage tank 14 is set upon a scale 16 configured to weigh the storage tank 14 in order to determine how much fluid is in the storage tank 14. The scale 16 is operatively connected to the controller 12 via one of the connectors 18. Hoses 20 provide a fluid path for fluid within the storage tank 14 to an air conditioning (A/C) system of a vehicle (not shown). Valves 22 are located at an end of the hoses 20 and are designed to mate with the A/C system. When the hoses 20 are disconnected from the A/C system, valves 22 are closed to prevent fluid from leaving the hoses 20 and discharging into the ambient air.

Pumps 26 are connected to the hoses 20 in order to move fluid through an interior 24 of the hoses 20 and in or out of the storage tank 14. The pumps 26 are connected to and controlled by the controller 12 via connectors 18. The pumps 26 can be controlled by the controller 12 via connectors 18 to be on or off and to selectively pump at certain pressures. Panel valves 27 are located along the hoses 20 and are configured to selectively permit fluid communication between the interior 24 of the hoses 20 and the interior of the storage tank 14. In some embodiments of the invention, the panel valves 27 may be operatively connected to the controller 12 via connectors 18.

Pressure sensors 28 are located in the hoses 20 and are configured to sense a fluid pressure within the interior 24 of the hoses 20 and report the sensed pressure to the controller 12 via the connectors 18. Temperature sensors 29 sense the temperature in hoses 20 and the temperature readings are sent to the controller via the connectors 18 for evaluation.

The display 30 is also connected to the controller 12 via connectors 18. The display displays various information related to the operations of the handling system 10 including calibration information and instructions. The display 30 can also indicate a visual message to a user and include a color, a text message, or an icon to indicate whether the scale 16 needs to be calibrated or not (as discussed below).

The connectors 18 may be a wired connection or may be a wireless connection. Connectors 18 of any type of operative connection are within the embodiments of the invention.

Figure 3:
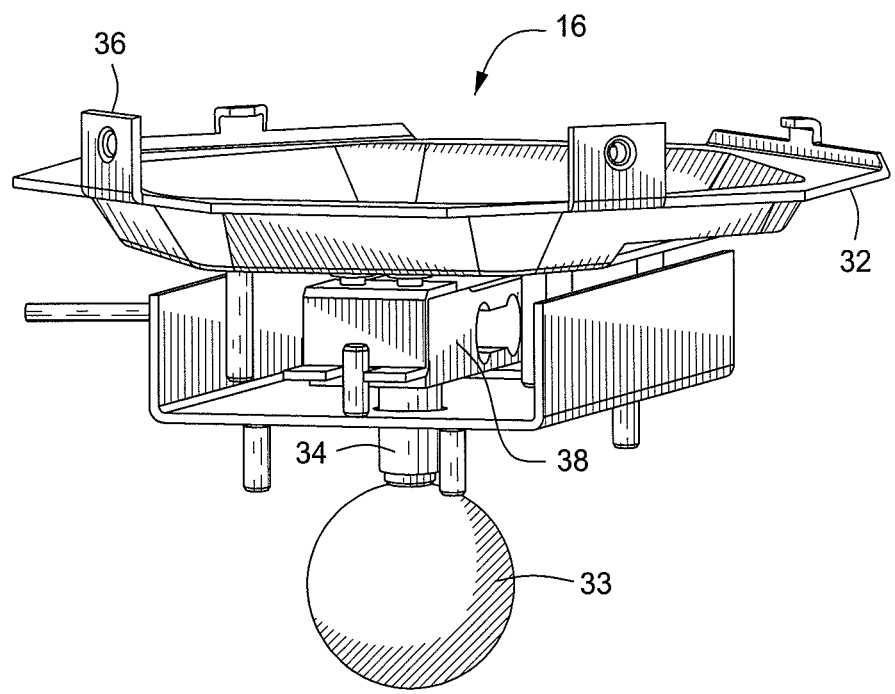
FIG. 3 illustrates a scale according to an embodiment of the invention.

FIG. 3 illustrates a scale 16 according to an embodiment of the invention. The scale 16 includes a tank tray 32, a tank holding member 36, a beam load cell 38, a ball 33 and a magnet 34. The tank tray 32 receives and holds the storage tank 14 in place. The storage tank 14 can be attached to tank holding member 36 so that the storage tank does not move during use. The tank tray 32 (coupled to one side of beam load cell) is in communication with the beam load cell 38 so that the beam load cell can determine the weight of the storage tank. The beam load cell 38 can be any type but should have tolerance within about 0.5 oz accuracy or less. Other tolerance are also contemplated such as between about 0.1 to about 1.5 ounces.

A magnet 34 is provided on the other side of the beam storage cell. The magnet 34 can be any magnet that attracts the ball 33 to it. Since the magnet 34 protrudes from the housing of the system 10, calibration testing of the scale 16 can be done without having to remove the tank from the system 10. The ball 33 can be any ball including steel balls. The ball should be one of a standard class that is made within certain diameters and spherical tolerances and material stability. This way, the same class of balls can be shipped with the system 10. However, in other embodiments, each ball can be individually measured and the system is calibrated based on each individual ball's weight and other characteristics. The ball can be shipped with the system 10 or sold individually.

Figure 4:
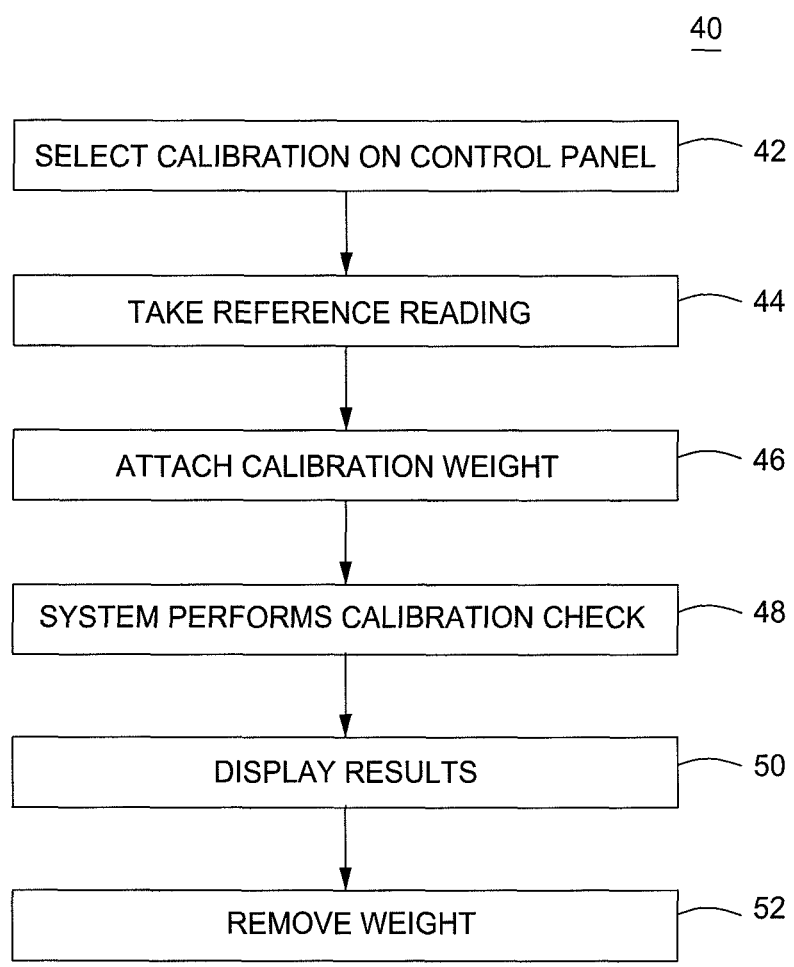
FIG. 4 is a flow chart illustrating the steps of calibration that may be followed in accordance with one embodiment of the present invention.

FIG. 4 is a flow chart illustrating the steps 40 that may be followed in accordance with one embodiment of the present invention. The steps herein do not have to be performed in the order shown and that other ordering is possible. At step 42, the user can select a button marked "calibration" on the control panel or can select it from a menu using arrow keys. At step 44, the system 10 with the controller can take a reference reading, which is the weight of the storage tank and/or the weight of the tank tray. This will act as "zeroing" of the scale. At step 46, the system then displays a message on a display, such as "attach weight to the bottom of the machine and press start to continue." The user can attach the weight to the bottom of the system 10. The weight can be any weight desired by the user so long as the controller knows which weight is being used. At step 48, the controller measures the weight and determines if the scale is within the tolerance level. The tolerance level should around 0.5 oz or less in order to comply with the new standard mentioned above. However, in other embodiments, other tolerances such as about 0.1 to about 1.5 ounces are contemplated. At step 50, the results are displayed. The display can indicate that the scale is within the predetermined tolerances or needs to be recalibrated. A number to the service center may also be displayed so that a calibration can be performed on the system 10. At step 52, the user removes the weight. The display can also be programmed to display a message to the user to remove the weight from the system 10.

In another embodiment, the process described above can be mostly automated. The controller can be programmed to take reference readings at certain points in time, such as after each servicing of a vehicle, after so many hours of use, after so many services, a time period between calibrations, other points of time and a combination thereof. Thus, when a user attaches the precalibrated weight to the magnet, the controller detects the weight and the calibration process can be started automatically.

In some embodiments of the invention, the user can be notified or communicated to by use of an audio signal to indicate whether or not the scale 16 needs to be calibrated. In other embodiments of the invention, an audio and visual signal generated by the display 30 can indicate to a user whether or not the scale 16 needs to be calibrated. In still other embodiments of the invention, the display 30 may display instructions for calibrating the scale.

The system 10 can also prompt the user to check the calibration of the system 10 depending on certain events or factors. Factors that can be used to prompt the user to perform a calibration check include the number of hours the system has been in service (after the last service to the system), the usage (the numbers of charges that has been completed), the length of time between calibrations, other factors and a combination thereof. The system can also be programmed to be locked out if the calibration fails or fails a number of times. After being locked down, the system 10 can be serviced and the locked down, unlocked. Alternatively, another calibration test can be conducted and if the scale is calibrated then the system 10 is unlocked.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A refrigerant recovery machine for use with a vehicle's cooling system, comprising:
   a refrigerant container containing a refrigerant for use with the vehicle's cooling system;
   a scale having a first side and a second side, wherein the first side is coupled to the refrigerant container to measure a weight of the refrigerant container in order to determine an amount of refrigerant in the refrigerant container, wherein the measured weight is a reference point to zero out the scale;
   a magnet coupled to the second side and configured to directly couple to a precalibrated weight having a first weight, wherein the precalibrated weight is located below a plane containing the scale;
   a pump configured to move the refrigerant to and from the vehicle's cooling system;
   an input device configured to receive an input selection to perform a scale calibration;
   a display configured to display information including a prompt to perform the scale calibration; and
   a controller that controls the scale, the pump and the display, wherein the controller is previously programmed with the first weight and wherein the controller is configured to determine if the scale is calibrated within a predetermined tolerance without having to remove the refrigerant container.

2. The refrigerant recovery machine of claim 1, wherein the information comprise an audio notification to a user that the scale needs to be calibrated.

3. The refrigerant recovery machine of claim 1, wherein the magnet, the scale and the precalibrated weight are used to determine if the refrigerant recovery machine is calibrated within the predetermined tolerance.

4. The refrigerant recovery machine of claim 3, wherein the tolerance is from about 0.1 to about 1.5 ounces.

5. The refrigerant recovery machine of claim 4, wherein the tolerance is about 0.5 oz.

6. The refrigerant recovery machine of claim 1, wherein the controller is configured to lock down the refrigerant recovery machine if the refrigerant recovery machine is not calibrated within the predetermined tolerance, and to unlock after being serviced.

7. The refrigerant recovery machine of claim 1, wherein the magnet is a permanent magnet.

8. The refrigerant recovery machine of claim 1, wherein the display is further configured to prompt a user to remove the precalibrated weight from the magnet.

9. The refrigerant recovery machine of claim 1, wherein the display is further configured to display a phone number for a service center.

10. The refrigerant recovery machine of claim 1, wherein the display displays that the calibration is required after a number of hours that the refrigerant recovery machine has been in service.

11. The refrigerant recovery machine of claim 1, wherein the display displays that the calibration is required after a number of charges has been completed.

12. A refrigerant recovery machine for use with a vehicle's cooling system, comprising:
    means for containing configured to contain a refrigerant for use with the vehicle's cooling system;
    means for measuring having a first side coupled with the means for containing and to measure a weight of the means for containing in order to determine an amount of refrigerant in the means for containing, wherein the measured weight is a reference point to zero the means for measuring;
    means for magnetizing configured to couple with a second side of the means for measuring and to directly couple to a precalibrated weight via a magnetic force, wherein the precalibrated weight is located below a plane containing the scale and having a first weight;
    means for pumping configured to move the refrigerant to and from the vehicle's cooling system;
    means for inputting configured to receive an input selection to perform a scale calibration;
    means for displaying configured to display information including a prompt to perform the scale calibration; and
    means for controlling configured to control the means for measuring, the means for pumping and the means for displaying, wherein the means for controlling is configured to determine if the means for measuring is working within a predetermined tolerance without having to remove the means for containing.

13. The refrigerant recovery machine of claim 12, wherein the information comprise an audio notification to a user that the means for measuring needs to be calibrated.

14. The refrigerant recovery machine of claim 12, wherein the means for attaching, the means for measuring and the precalibrated weight are used to determine if the refrigerant recovery machine is calibrated within a predetermined tolerance.

15. The refrigerant recovery machine of claim 14, wherein the tolerance is from about 0.1 to about 1.5 ounces.

16. The refrigerant recovery machine of claim 15, wherein the tolerance is about 0.5 oz.

17. The refrigerant recovery machine of claim 12, wherein the means for controlling is configured to lock the refrigerant recovery machine if the refrigerant recovery machine is not calibrated within a predetermined tolerance, and to be unlocked after being serviced.

18. The refrigerant recovery machine of claim 12, wherein the means for displaying is further configured to prompt a user to remove the precalibrated weight from the means for magnetizing.

* * * * *